March 12, 1963  G. B. KOLOKYTHAS  3,081,137
ABSORBENT STORAGE INSERT FOR CONTAINER CAP
Filed June 20, 1960  2 Sheets-Sheet 1

INVENTOR
GEORGE B. KOLOKYTHAS
BY
ATTORNEYS.

March 12, 1963  G. B. KOLOKYTHAS  3,081,137
ABSORBENT STORAGE INSERT FOR CONTAINER CAP
Filed June 20, 1960  2 Sheets-Sheet 2

INVENTOR
GEORGE B. KOLOKYTHAS
BY
ATTORNEYS.

United States Patent Office 3,081,137
Patented Mar. 12, 1963

3,081,137
ABSORBENT STORAGE INSERT FOR CONTAINER CAP
George B. Kolokythas, 50 Fokionos Negri St., Athens, Greece
Filed June 20, 1960, Ser. No. 37,209
3 Claims. (Cl. 312—31.1)

This invention relates to an improved storage container including improved means for holding a desiccant or the like out of physical contact with the main contents of the container, but in position to absorb moisture to keep said main contents relatively moisture-free.

Moisture-free storage of powders, capsules, tablets, crystals, granules or other solid substances, particularly in the chemical or pharmaceutical industries, has constantly presented a problem. Whenever a portion of the substance was removed from its container, water vapor present in the ambient air would enter the container and would subsequently be absorbed by the remaining substance, causing lumps or other decomposition therein. Similarly, many substances either contain trace contaminations which have objectionable odor or deteriorate to exhibit odors which may be mitigated or removed by an absorbent such as activated charcoal.

Accordingly, an object of this invention is to provide a container closure which can serve effectively to close the container and can also hold a receptacle in its hollow interior in such manner as to allow gas flow communication between the contents of the receptacle and the container. The receptacle may then contain a suitable desiccant which will absorb the water vapor that is present in the container, thereby maintaining the powder or other substance contained in the bottle in a permanently dry condition. Alternatively, the receptacle may contain an absorbent such as charcoal granules, to remove odors from the air space of the container.

Another object of this invention is to provide a container closure of such nature which will have communicating passages for gas flow between the interiors of the receptacle and the container but will prevent mingling of the desiccant or odor absorbent with the contents of the container.

Another object of this invention is to provide such a container closure with a receptacle which may be readily separable from the hollow interior of the container closure.

Another object of this invention is to provide such a container closure in combination with a container having a neck of suitable dimensions to receive said closure in frictional engagement.

A further object of this invention is to provide such a container closure that is comparatively inexpensive and simple to manufacture.

Other objects and advantages of this invention are hereinafter set forth or will appear in the further course of the specification.

For an understanding of the principles of this invention, reference is made to the following description of a typical embodiment thereof as illustrated in the accompanying drawings.

Figure 1:
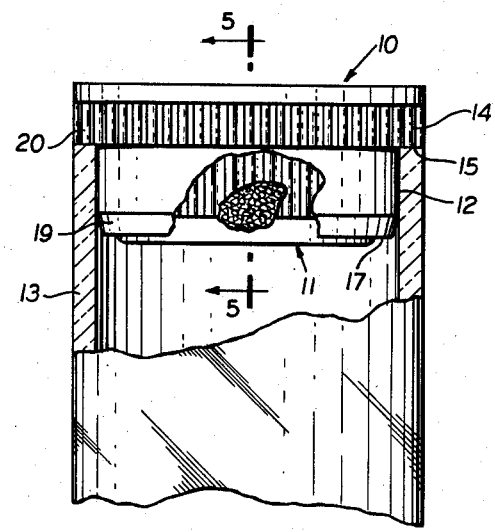
FIG. 1 is a side elevational view of a container closure according to a first embodiment of the invention as inserted in the neck of a container, with cut-away portions of the shank and the receptacle showing a partial structure of the receptacle and the contents thereof.
Figure 2:
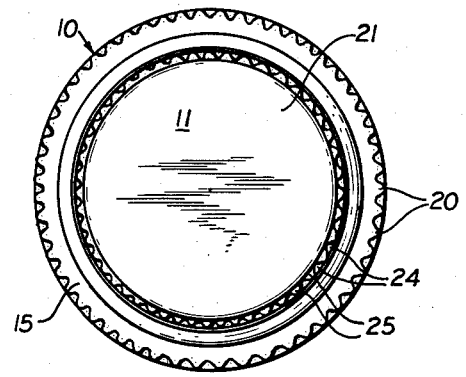
FIG. 2 is a bottom plan view of the closure.
Figure 3:
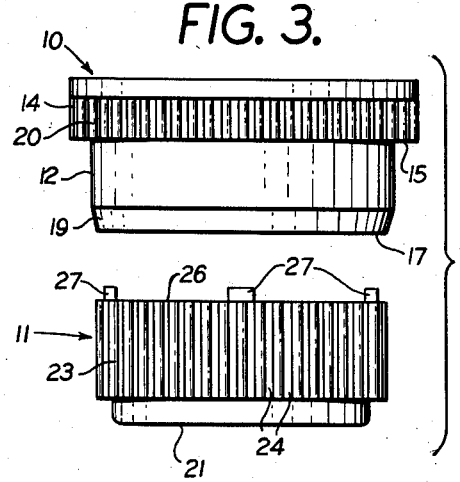
FIG. 3 is an exploded side elevational view of the closure showing the stopper and the receptacle.
Figure 4:
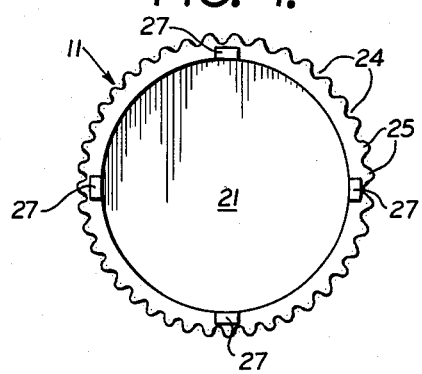
FIG. 4 is a top plan view of the receptacle.

The embodiment of the invention illustrated in FIGS. 1 to 5 of the drawings consists of a stopper 10 and a receptacle 11 in combination. The stopper 10 has a cylindrical shank 12 that is adapted to be inserted into the neck 13 of a bottle and is integral with a cylindrical cap 14. Cap 14 is in axial alignment with and of greater diameter than shank 12, and forms a shoulder 15 that abuts against the edge of the neck 13 into which the shank 12 is pressed. The shank 12 and the cap 14 have an axial bore 16 extending to the lower end 17 of the stopper 10. The bore 16 forms a relatively thin cylindrical wall 18 in the shank 12. The shank wall 18 has a tapered lower end portion 19 to facilitate insertion into the neck 13.

The shank 12 in this embodiment is optionally molded from pliable material, preferably a thermoplastic which is pliable at ordinary temperatures. It therefore has sufficient elasticity to conform to the neck 13 of a bottle into which it is pressed and make a tight fit therewith. One such material found to be suitable is polyethylene.

While it is essential that the shank 12 be pliable, the cap 14 need not be so. However, the shank 12 and cap 14 may be molded in one piece as illustrated herein. The cap 14 optionally has a circumferential knurl 20 to afford a serviceable gripping surface for removal of the stopper 10 from the bottle neck 13.

The receptacle 11 is cylindrical and may be made of plastic, metal, ceramic or other suitable material either rigid or pliable. Optionally, as illustrated herein, receptacle 11 consists of the same pliable material as that of stopper 10. It has a lower end wall 21, and a peripheral wall 22 with an integrally formed annular ring portion 23. The annular ring 23 has a plurality of longitudinal, circumferentially spaced parallel flutings 24 of substantially equal dimensions defining adjoining ridges 25 therebetween. Formed integrally with the rim 25 of receptacle 11 are spaced spacing means or pins 27, optionally four in number, of suitable substantially equal dimensions.

The outermost diameter of receptacle 11 from ridge to ridge 25, 25 is sufficiently greater than the diameter of bore 16 so that the insertion of receptacle 11 therein tends to produce relative distortion of the shank and of receptacle walls 18, 22 so as to produce a tight-fitting engagement. Distortion of shank wall 18 is alone sufficient to maintain frictional engagement, however, when the receptacle 11 is made of more rigid material than in this embodiment.

When the receptacle 11 is fully inserted in the bore 16, the pins 27 serve to space the receptacle 11 from the upper wall 28 of the bore 16, and the lower end wall 21 of receptacle 11 protrudes sufficiently beyond the shank wall 18 to provide a convenient gripping surface for removal of receptacle 11. Any other suitable means for holding receptacle 11 spaced from wall 16 may be provided.

Figure 5:
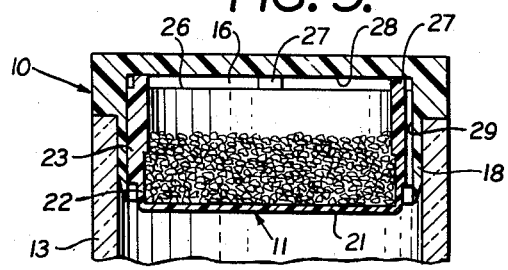
FIG. 5 is a section on line 5—5 of FIG. 1.

In FIG. 5 it can be seen that the interior of the receptacle 11 communicates with the interior of the bottle (not shown) through the spaces bounded by the rim 26 of receptacle 11, any two of the pins 27, 27 and the upper wall 28 of bore 16, and through the spaces formed by the flutings with the cylindrical surface 29 of bore 16.

The invention arrangement is used in the following manner.

A quantity of suitable desiccant, deodorant or other absorbent material is placed in the receptacle 11. The receptacle 11 is pressed into the shank bore 16 of the stopper 10 which is held in a generally upright position to avoid spilling the desiccant. The substance which is to be stored is deposited in a container having a hollow neck 13 of suitable dimensions to receive the shank 12 of the stopper 10 in frictional engagement therewith. The shank 12 is then pressed into the neck 13 of the container.

Water vapor or other gaseous material trapped within the container passes through the spaces between the peripheral wall 22 of the receptacle 11 and the cylindrical surface 29 of the bore 16, then over the rim 25 of the receptacle 11 which is spaced from the upper wall 28 of the bore 16 by the pins 27, and into the interior of the receptacle 11 where it is absorbed by the desiccant or other absorbent.

Upon subsequent opening and closing of the container, water vapor in the entrapped air is similarly absorbed each time before it can effect the undesirable caking, or lumping or deterioration of the contents of the container.

When the material in receptacle 11 reaches a predetermined condition reducing its effectiveness, the container closure may be removed from the neck 13 of the container. The receptacle 11 is then drawn out of the shank bore 16 of the stopper 10 by gripping the portion of the peripheral wall 28 thereof which protrudes beyond the shank wall 18. The receptacle 11 is then emptied of its contents which are replaced by a fresh supply of material. The receptacle 11 is then restored to its previous position in the shank bore 16 and the container closure is once again inserted into the neck 13 of the container.

It will be understood that another appropriate material, such as an odor absorbent, may be incorporated in the receptacle 11.

Figure 6:
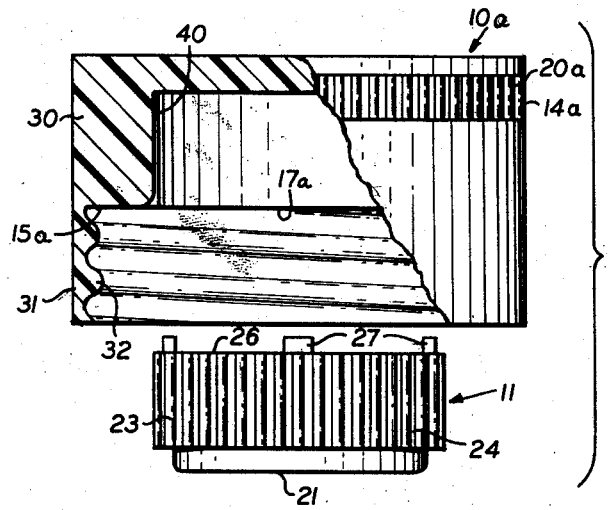
FIG. 6 is an exploded side elevational view, partly in vertical section, of a second embodiment of the invention.
Figure 7:
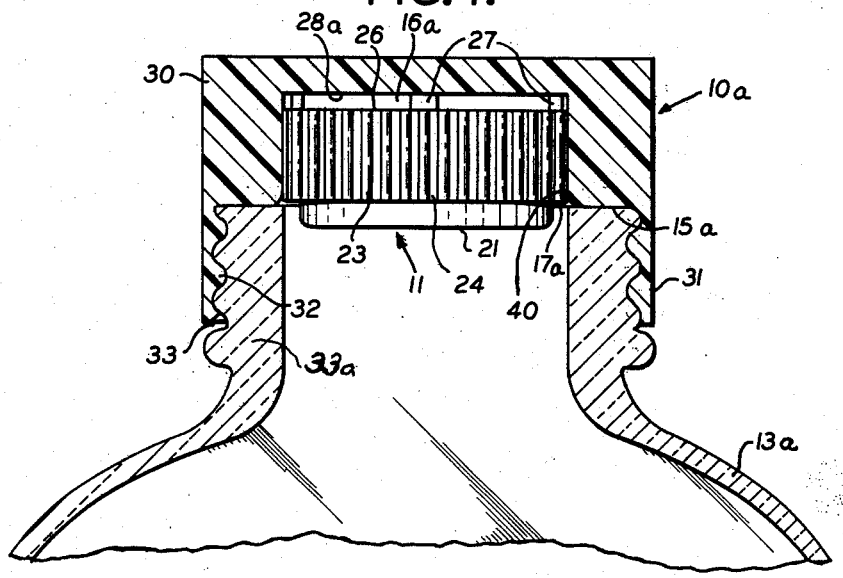
FIG. 7 is a vertical section of the closure, mounted on a container.

It will be apparent that the invention is subject to various possible modifications. For example, while the container closure has been shown and described as having a shank which is held within the container neck bore by frictional engagement, it will be apparent that the closure may be secured in place on the container by any suitable means, such as a screw cap or other means. (FIGS. 6 and 7.)

The container being broken away in the drawing, it will be apparent that the lower end structure of the container may optionally be a duplication of the upper end structure. In other words, the container may be double-ended and may have a closure of the type disclosed herein applied to both ends. By way of illustration, one closure may contain a desiccant and the other an absorbent. The container may also have more than two openings for insertion of my improved closures, for various purposes.

It will be apparent that my improved structure is not limited to the applications set forth above and may be used in other applications in which it is desired to dispose two substances in a container, physically separate but in fluid communication.

While in some applications the substance in container 13 and the substance in receptacle 11 can be quite fine, I generally prefer that the particle size of each substance be sufficiently great to prevent passage thereof between container 13 and receptacle 11.

*Embodiment of FIGS. 6 and 7*

The invention being applicable to screw caps, as mentioned above, a second embodiment, wherein the closure is applied to a screw cap, has been specifically shown.

In this embodiment, screw cap 10a is provided for container 13a having a neck 33a with external screw thread 33. Screw cap 10a has a cylindrical top wall or head 30 which has a bottom face 17a. Cylindrical peripheral wall 31 extends from head 30 below surface 17a and has an internal screw thread 32. Cap wall 31 may be screwed onto neck 33a in the usual manner with head surface 17a abutting the neck lip (no sealing gasket or the like is shown, for simplification).

Head 30 is somewhat higher than normal, for purpose of the invention, and has a central recess 40 extending to bottom surface 17a. Recess 40 has a top wall 28a and a cylindrical peripheral wall 16a. The diameter of wall 16a is optionally about the same as the diameter of the bore of neck 33a.

Receptacle 11 is the same as in the first embodiment and is adapted to be frictionally received within wall 16a with pins 27 abutting wall 28a. Lower end wall 21 projects below surface 17a to provide a gripping surface for removal of receptacle 11.

The operation of the two embodiments is the same.

While I have disclosed preferred embodiments of the invention and have indicated various changes, omissions and additions which can be made therein, it will be apparent that various other changes, omissions and additions may be made in the invention without departing from the scope and spirit thereof.

What is claimed is:

1. In combination, a closure member for a container, said closure member being made of moldable, pliable, non-stretchable plastic material and having an axial bore extending to the lower end thereof, said bore having a flat, transverse upper surface and a cylindrical peripheral surface, said member having means for engagement with said container, and a receptacle of material substantially similar to that of said closure member, said receptacle having a cylindrical peripheral wall extending frictionally into said bore and having a bottom wall and being open at the top, said receptacle extending slightly below the bottom of said bore, said peripheral wall of said receptacle having an upper surface with a plurality of circumferentially spaced pins extending upwardly therefrom, said pins engaging the upper surface of said bore, the length of said receptacle including said pins exceeding the length of said bore, said peripheral wall of said receptacle having a plurality of grooves in its outer surface extending from the top thereof to at least the bottom of said bore, the height of each pin being at least as great as the radial dimension of the groove, said grooves being circumferentially spaced and serving as ducts permitting gas flow communication between the interiors of said receptacle and said container while granular material of particle diameter greater than the transverse dimension of said ducts is confined within said receptacle.

2. Combination in accordance with claim 1, said means for engagement with said container comprising a skirt depending from said lower end of said closure member and having a through bore of greater diameter than the bore of said closure member.

3. A container closure member comprising a longitudinally extending stopper having a shank of molded, pliable, non-stretchable plastic material adapted to be extended frictionally into the neck of the container, and a receptacle of material substantially similar to that of said shank, said shank having an axial bore extending to the lower end thereof, said bore having a flat, transverse upper surface and a cylindrical peripheral surface, said receptacle having a cylindrical peripheral wall extending frictionally into said bore and having a bottom wall and being open at the top, said receptacle extending slightly below the bottom of said bore, said peripheral wall of said receptacle having an upper surface with a plurality of circumferentially spaced pins extending upwardly therefrom said pins engaging the upper surface of said bore, the length of said receptacle including said pins exceeding the length of said bore said peripheral wall of said receptacle having a plurality of grooves in its outer surface extending from the top thereof to at least the bottom of said bore, the height of each pin being at least as great as the radial dimension of the groove, said grooves being circumferentially spaced and serving as ducts permitting gas flow communication between the interiors of said receptacle and said container while granular material of particle diameter greater than the transverse diameter of said ducts is confined within said receptacle.

References Cited in the file of this patent

UNITED STATES PATENTS

| | | |
|---|---|---|
| 1,748,449 | Hughett | Feb. 25, 1930 |
| 2,147,139 | Bigman | Feb. 14, 1939 |
| 2,548,168 | Luce | Apr. 10, 1951 |
| 2,676,078 | Young | Apr. 20, 1954 |

FOREIGN PATENTS

| | | |
|---|---|---|
| 158,782 | Switderland | Feb. 16, 1933 |